(12) United States Patent
Bian et al.

(10) Patent No.: US 11,269,142 B2
(45) Date of Patent: Mar. 8, 2022

(54) OPTICAL COUPLERS WITH SEGMENTED WAVEGUIDES

(71) Applicant: GLOBALFOUNDRIES U.S. Inc., Santa Clara, CA (US)

(72) Inventors: Yusheng Bian, Ballston Lake, NY (US); Bo Peng, Wappingers Falls, NY (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 20 days.

(21) Appl. No.: 16/837,149

(22) Filed: Apr. 1, 2020

(65) Prior Publication Data
US 2021/0311253 A1    Oct. 7, 2021

(51) Int. Cl.
| | |
|---|---|
| *G02B 6/10* | (2006.01) |
| *G02B 6/125* | (2006.01) |
| *G02B 6/122* | (2006.01) |
| *G02B 6/12* | (2006.01) |

(52) U.S. Cl.
CPC .............. *G02B 6/125* (2013.01); *G02B 6/107* (2013.01); *G02B 6/1223* (2013.01); *G02B 2006/12061* (2013.01); *G02B 2006/12147* (2013.01)

(58) Field of Classification Search
CPC ...... G02B 6/125; G02B 6/107; G02B 6/1223; G02B 2006/12061; G02B 2006/12147
USPC .......................... 385/8, 9, 14, 42, 43, 46, 132
See application file for complete search history.

(56) References Cited

U.S. PATENT DOCUMENTS

| | | | | |
|---|---|---|---|---|
| 5,610,760 | A * | 3/1997 | Drenten | G02F 1/3775 |
| | | | | 359/332 |
| 5,629,999 | A * | 5/1997 | Henry | G02B 6/10 |
| | | | | 385/27 |
| 7,532,793 | B2 * | 5/2009 | Jepsen | G02B 6/125 |
| | | | | 385/30 |
| 8,948,549 | B2 * | 2/2015 | Picard | G02B 6/2766 |
| | | | | 385/11 |
| 2004/0156590 | A1 * | 8/2004 | Gunn, III | G02B 6/124 |
| | | | | 385/37 |
| 2006/0233504 | A1 * | 10/2006 | Hochberg | B82Y 10/00 |
| | | | | 385/129 |
| 2008/0193080 | A1 * | 8/2008 | Cheben | G02B 6/1228 |
| | | | | 385/28 |
| 2017/0146738 | A1 * | 5/2017 | Xu | G02F 1/0147 |
| 2018/0120504 | A1 * | 5/2018 | Qi | G02B 5/1809 |
| 2020/0064554 | A1 * | 2/2020 | Lin | G02B 6/305 |

(Continued)

OTHER PUBLICATIONS

"Waveguide sub-wavelength structures: a review of principles and applications" by Halir et al, Laser & Photonics Reviews, vol. 9, No. 1, pp. 25-49 (Year: 2015).*

(Continued)

*Primary Examiner* — Robert Tavlykaev
(74) *Attorney, Agent, or Firm* — Thompson Hine LLP; Anthony Canale

(57) ABSTRACT

Structures for an optical coupler and methods of fabricating a structure for an optical coupler. A coupling section has a plurality of segments arranged with a pitch, a first waveguide core has a section extending longitudinally over the first plurality of segments of the coupling section, and a second waveguide core has a section extending longitudinally over the coupling section. The section of the second waveguide core laterally spaced from the section of the first waveguide core by a given distance.

20 Claims, 4 Drawing Sheets

(56) References Cited

U.S. PATENT DOCUMENTS

2020/0225412 A1* 7/2020 Gonz Lez Andrade . G02B 6/34
2021/0033789 A1* 2/2021 Villafranca Velasco ..................... G02B 6/126

OTHER PUBLICATIONS

Mu, X.; Wu, S.; Cheng, L.; Fu, H., "Edge Couplers in Silicon Photonic Integrated Circuits: A Review", Published Feb. 24, 2020, Appl. Sci. 10, 1538.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paperT3H.3.

B. Heng, I. Barwicz, A. Sahin, I. Houghton, B. Hedrick, Y. Bian, M. Rakowski, S. Hu, J. Ayala, C. Meagher, Z. Sowinski, K. Nummy, A. Stricker, J. Lubguban, H. Chen, B. Fasano, I. Melville, Z. Wu, J. K. Cho, A. Jacob, D. Riggs, D. Berger, T. Letavic, A. Yu, J. Pellerin, and K. Giewont, "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

Moreno et al., "Reduction of Wavelength Dependence of Coupling Characteristics Using Si Optical Waveguide Curved Directional Coupler", Journal of Lightwave Technology, vol. 32, No. 12, Jun. 15, 2014.

Gupta et al., "Wavelength-Independent Directional Couplers for Integrated Silicon Photonics", Journal of Lightwave Technology, vol. 35, No. 22, Nov. 15, 2017.

* cited by examiner

OPTICAL COUPLERS WITH SEGMENTED WAVEGUIDES

BACKGROUND

The present invention relates to photonics chips and, more specifically, to structures for an optical coupler and methods of fabricating a structure for an optical coupler.

Photonics chips are used in many applications and systems such as data communication systems and data computation systems. A photonics chip integrates optical components, such as waveguides, optical switches, and optical couplers, and electronic components, such as field-effect transistors, into a unified platform. Among other factors, layout area, cost, and operational overhead may be reduced by the integration of both types of components.

Optical couplers are optical components that are commonly used in photonics chips to couple light between waveguides with desired coupling ratios. Adiabatic 3-dB optical couplers are two-input by two-output couplers that may be used on a photonics chip for coupling/splitting light. Conventional adiabatic 3-dB optical couplers may have a large footprint, may exhibit a wavelength dependence, and may be sensitive to fabrication errors. Conventional adiabatic 3-dB optical couplers may also exhibit a high insertion loss.

Improved structures for an optical coupler and methods of fabricating a structure for an optical coupler are needed.

SUMMARY

In an embodiment of the invention, a structure for an optical coupler is provided. The structure includes a coupling section having a plurality of segments arranged with a pitch, a first waveguide core having a section extending longitudinally over the first plurality of segments of the coupling section, and a second waveguide core having a section extending longitudinally over the coupling section. The section of the second waveguide core and the section of the first waveguide core are laterally spaced by a given distance.

In an embodiment of the invention, a method of forming a structure for an optical coupler is provided. The method includes forming a coupling section including a plurality of segments arranged with a pitch, forming a first waveguide core including a section extending longitudinally over the first plurality of segments of the coupling section, and forming a second waveguide core including a section extending longitudinally over the coupling section. The section of the second waveguide core is laterally spaced from the section of the first waveguide core by a given distance.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
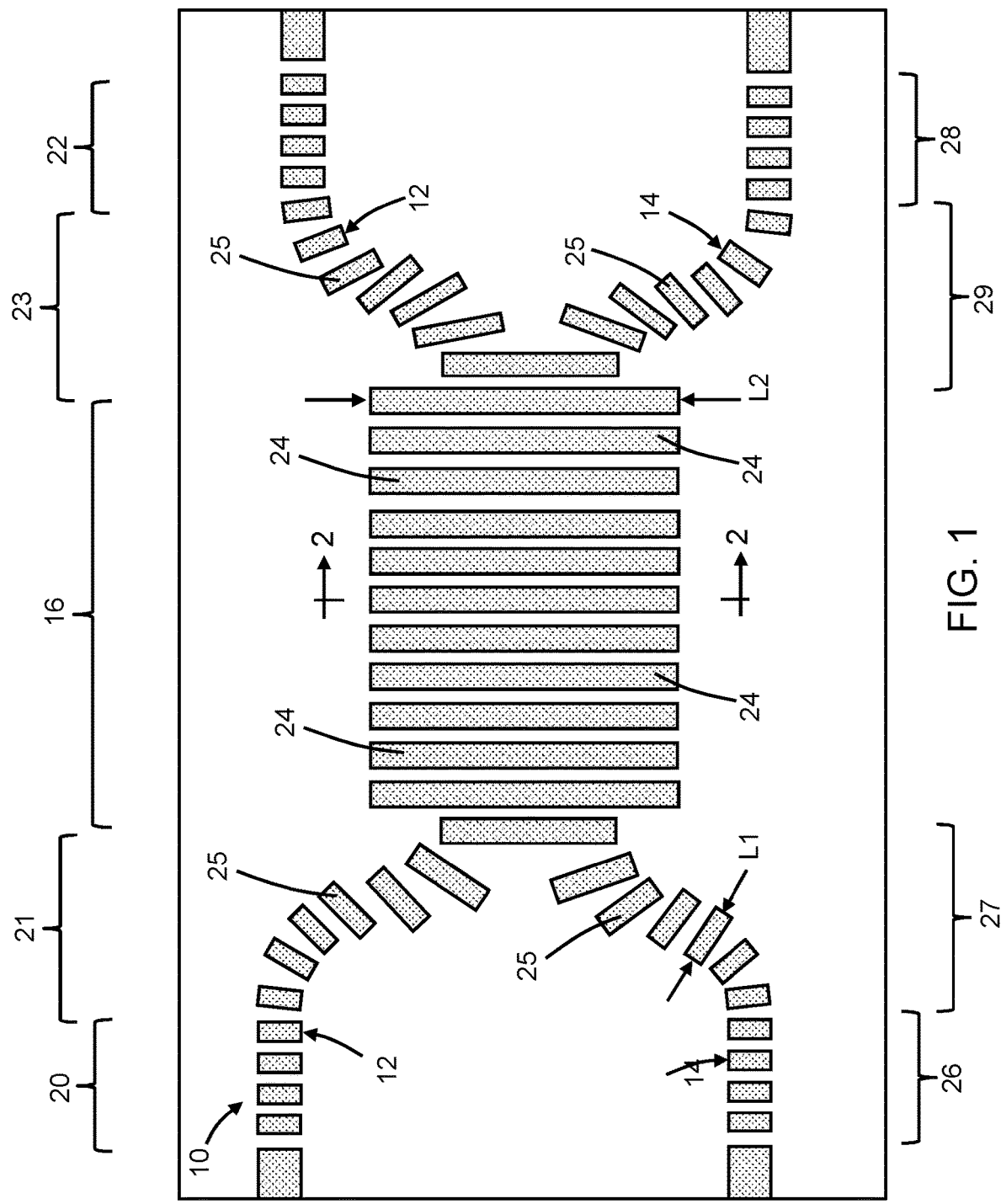
FIG. 1 is a top view of a structure at an initial fabrication stage of a processing method in accordance with embodiments of the invention.
Figure 2:
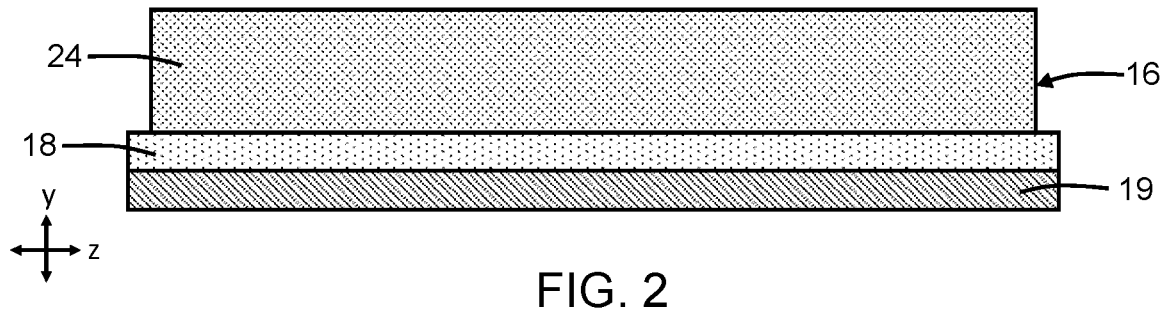
FIG. 2 is a cross-sectional view taken generally along line 2-2 in FIG. 1.

With reference to FIGS. 1, 2 and in accordance with embodiments of the invention, a structure 10 for an optical coupler, such as an adiabatic 3-dB optical coupler, includes a waveguide core 12, a waveguide core 14, and a coupling section 16 that are positioned over a dielectric layer 18. The waveguide cores 12, 14 and coupling section 16 may have the same composition. In an embodiment, the waveguide cores 12, 14 and coupling section 16 may be composed of a material having a refractive index in a range of about 2.5 to about 5. In an embodiment, the waveguide cores 12, 14 and coupling section 16 may be composed of a single-crystal semiconductor material, such as single-crystal silicon. The single-crystal semiconductor material may originate from a device layer of a silicon-on-insulator (SOI) substrate that further includes a buried insulator layer composed of a dielectric material, such as silicon dioxide, that provides the dielectric layer 18 and a handle substrate 19 composed of a single-crystal semiconductor material, such as single-crystal silicon, under the buried insulator layer. The waveguide cores 12, 14 and coupling section 16 may be concurrently patterned from the layer of single-crystal semiconductor material by lithography and etching processes during front-end-of-line processing. The layer of single-crystal semiconductor material may be fully etched to define the waveguide cores 12, 14 and coupling section 16 as ridge elements as shown or, alternatively, the layer of single-crystal semiconductor material may only be partially etched to define rib elements including a connected slab positioned on the dielectric layer 18.

The waveguide core 12 includes an input section 20, a routing section 21, an output section 22, and a routing section 23. The coupling section 16 is connected to the input section 20 by the routing section 21, and the coupling section 16 is connected to the output section 22 by the routing section 23.

The input section 20 and the routing section 21 of the waveguide core 12 include segments 25 of a given pitch that connect a non-segmented section of the waveguide core 12 to the coupling section 16. The segments 25 of the routing section 21 are arranged in a pair of bends that displace the waveguide core 12 laterally relative to the input section 20 and reroute the waveguide core 12 toward the coupling section 16. The lengths, L1, of the segments 25 of the routing section 21 may decrease with increasing distance from the coupling section 16 to provide tapering, and the segments 25 of the routing section 21 may be rotationally oriented based on the curvature of the bends. The segment 25 of the routing section 21 closest to the coupling section 16 is the longest segment among the segments 25. The segment 25 of the routing section 21 closest to the input section 20 is the shortest segment among the segments 25. In an alternative embodiment, the lengths, L1, of the segments 25 of the routing section 21 may be uniform such that the routing section 21 is not tapered.

The output section 22 and the routing section 23 of the waveguide core 12 include segments 25 of a given pitch that connect another non-segmented section of the waveguide core 12 to the coupling section 16. The segments 25 of the routing section 23 are arranged in a pair of bends that displace the waveguide core 12 laterally relative to the output section 22 and reroute the waveguide core 12 away from the coupling section 16. The lengths, L1, of the segments 25 of the routing section 23 may decrease with increasing distance from the coupling section 16 to provide tapering, and the segments 25 of the routing section 23 may be rotationally oriented based on the curvature of the bends. The segment 25 of the routing section 23 closest to the coupling section 16 is the longest segment among the segments 25. The segment 25 of the routing section 23 closest to the output section 22 is the shortest segment among the segments 25. In an alternative embodiment, the lengths, L1, of the segments 25 of the routing section 23 may be uniform such that the routing section 23 is not tapered.

The waveguide core 14 includes an input section 26, a routing section 27, an output section 28, and a routing section 29. The coupling section 16 is connected to the input section 26 by the routing section 27, and the coupling section 16 is connected to the output section 28 by the routing section 29. The input section 20 of the waveguide core 12 and the input section 26 of the waveguide core 14 may be spatially separated by a distance adequate to ensure that light coupling does not occur. Similarly, the output section 22 of the waveguide core 12 and the output section 28 of the waveguide core 14 may be spatially separated by a distance adequate to ensure that light coupling does not occur. The light coupling between the waveguide cores 12, 14 occurs primarily in the coupling section 16 of the structure 10.

The input section 26 and the routing section 27 of the waveguide core 14 include segments 25 of a given pitch that connect a non-segmented section of the waveguide core 14 to the coupling section 16. The segments 25 of the routing section 27 are arranged in a pair of bends that displace the waveguide core 14 laterally relative to the input section 26 and reroute the waveguide core 14 toward the coupling section 16. The lengths, L1, of the segments 25 of the routing section 27 may decrease with increasing distance from the coupling section 16 to provide tapering, and the segments 25 of the routing section 27 may be rotationally oriented based on the curvature of the bends. The segment 25 of the routing section 27 closest to the coupling section 16 is the longest segment among the segments 25. The segment 25 of the routing section 27 closest to the input section 26 is the shortest segment among the segments 25. In an alternative embodiment, the lengths, L1, of the segments 25 of the routing section 27 may be uniform such that the routing section 27 is not tapered.

The output section 28 and the routing section 29 of the waveguide core 14 include segments 25 of a given pitch that connect a non-segmented section of the waveguide core 14 to the coupling section 16. The segments 25 of the routing section 29 are arranged in a pair of bends that displace the waveguide core 14 laterally relative to the output section 28 and reroute the waveguide core 14 away from the coupling section 16. The lengths, L1, of the segments 25 of the routing section 29 may decrease with increasing distance from the coupling section 16 to provide tapering, and the segments 25 of the routing section 29 may be rotationally oriented based on the curvature of the bends. The segment 25 of the routing section 29 closest to the coupling section 16 is the longest segment among the segments 25. The segment 25 of the routing section 29 closest to the output section 28 is the shortest segment among the segments 25. In an alternative embodiment, the lengths, L1, of the segments 25 of the routing section 29 may be uniform such that the routing section 29 is not tapered.

The coupling section 16, which is shared by the waveguide cores 12, 14, includes segments 24 that are laterally spaced with a given pitch. The segments 24 have lengths that are greater than the widths of the waveguide cores 12, 14 and greater than the lengths of the segments 25. The segments 24 of the coupling section 16 may have a length dimension in a range of one (1) micron to ten (10) microns slab width, a thickness in a range of one hundred fifty (150) nanometers to four hundred (400) nanometers, and a spacing in a range from one hundred (100) nanometers to one and one-half (1.5) microns. The segments 25 may have a length dimension in a range of eighty (80) nanometers to one (1) micron, a thickness in a range of one hundred fifty (150) nanometers to four hundred (400) nanometers, and a spacing in a range from one hundred (100) nanometers to one and one-half (1.5) microns.

In an alternative embodiment, the pitches of the segments 25 of the routing sections 21, 23 of the waveguide core 12 and/or the pitches of the segments 25 of the routing sections 27, 29 of the waveguide core 14 may be apodized. The sections 20, 21, 22, 23 of the waveguide core 12, the sections 26, 27, 28, 29 of the waveguide core 14, and the coupling section 16 may be coplanar at their top and bottom surfaces to provide a uniform thickness. In an alternative embodiment, the sections 20, 21, 22, 23, 24 of the waveguide core 12, the sections 26, 27, 28, 29 of the waveguide core 14, and the coupling section 16 may have different thicknesses.

The coupling section 16 may be considered to be an array or matrix of segments 24 characterized by properties (e.g., refractive index) that differ from bulk properties, commonly referred to as a metamaterial. The pitches of the segments 24 and each group of the segments 25 are less than the wavelength of the laser light being guided by the waveguide cores 12, 14 and exchanged by coupling in the coupling section 16.

Figure 4:
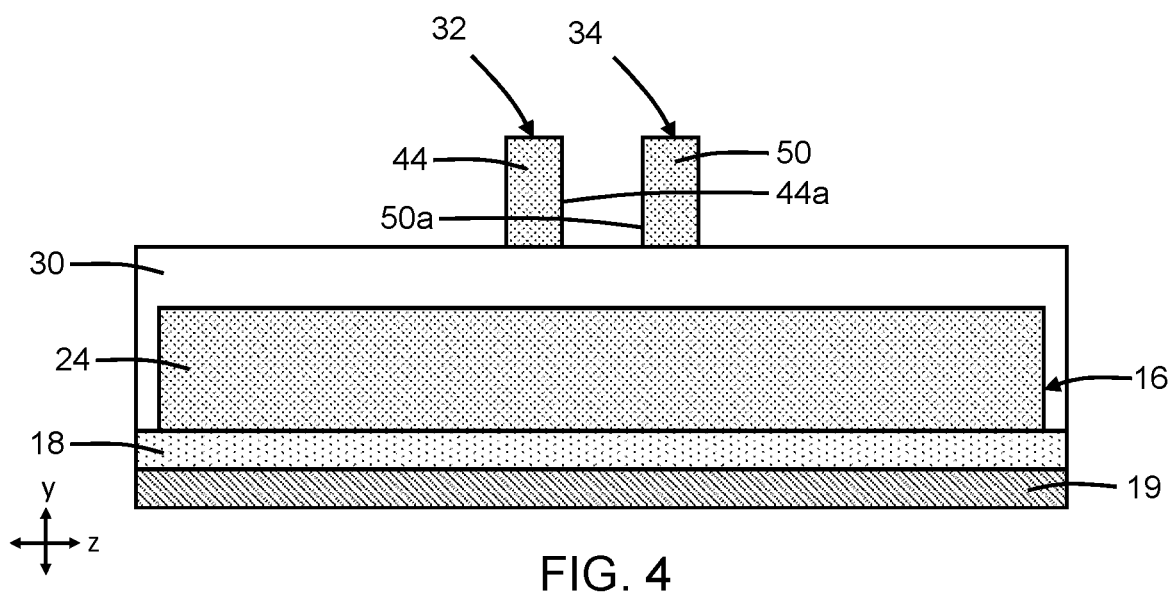
FIG. 4 is a cross-sectional view taken generally along line 4-4 in FIG. 3.
Figure 3:
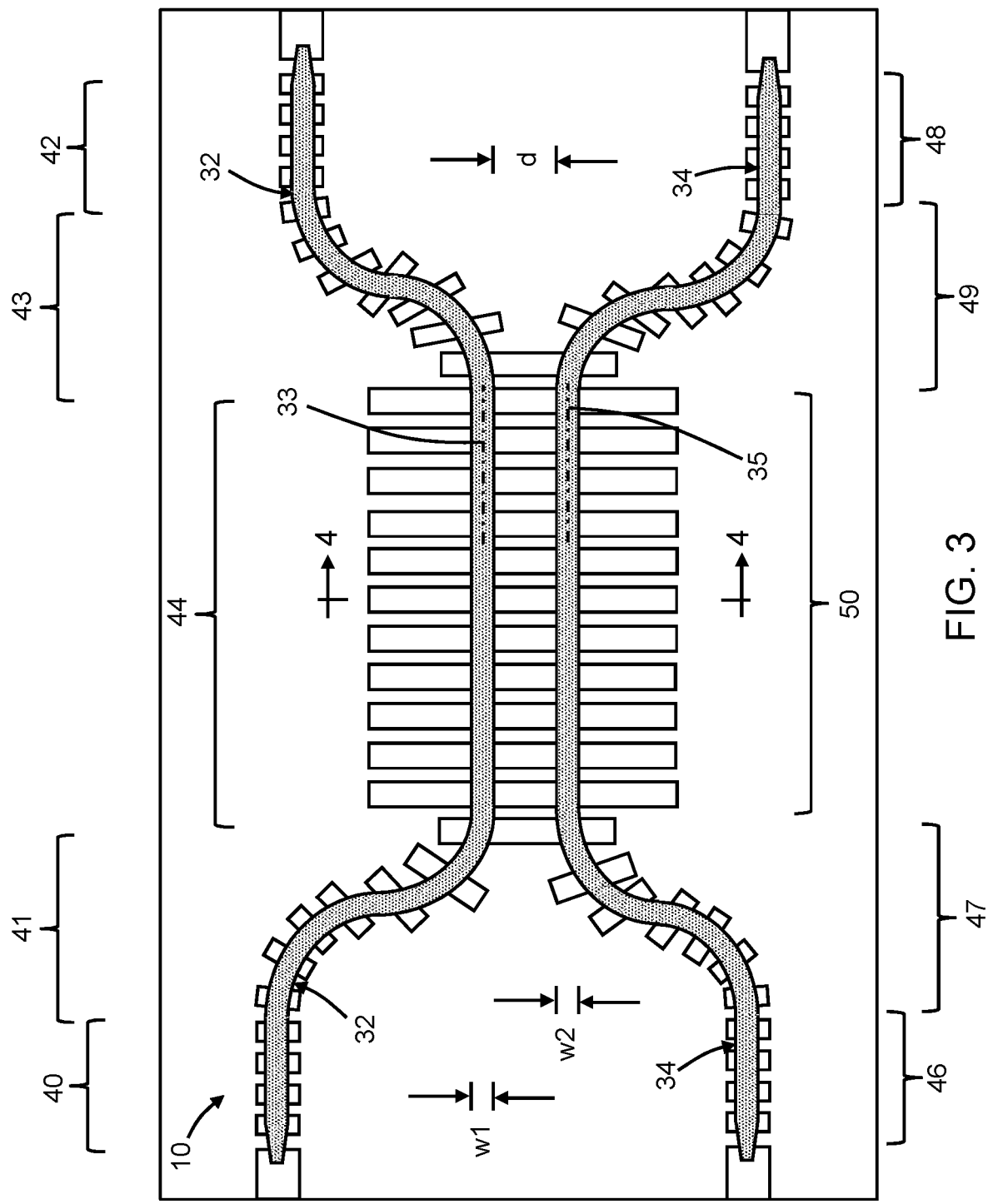
FIG. 3 is a top view of the structure at a fabrication stage of the processing method subsequent to FIG. 1.

With reference to FIGS. 3, 4 in which like reference numerals refer to like features in FIGS. 1, 2 and at a subsequent fabrication stage, a dielectric layer 30 is formed over the waveguide cores 12, 14 and coupling section 16. The dielectric layer 30 may be composed of a dielectric material that is deposited by atomic layer deposition or chemical vapor deposition. The dielectric layer 30 may be planarized after deposition with, for example, chemical mechanical polishing to remove topography. In an embodiment, the dielectric layer 30 may be composed of a material having a refractive index in a range of about 1 to about 1.6. In an embodiment, the dielectric layer 30 may be composed of silicon dioxide. Dielectric material from the dielectric layer 30, which has a lower index than the waveguide cores 12, 14 and coupling section 16, fills the spaces between their respective segments 24.

A waveguide core 32 and a waveguide core 34 are formed on the dielectric layer 30. The waveguide cores 32, 34 may be concurrently patterned from a deposited layer by lithography and etching processes during middle-of-line or back-end-of-line processing of the photonics chip. The deposited layer may be fully etched to define the waveguide cores 32, 34 as ridge waveguides as shown or, alternatively, may only be partially etched to define a rib waveguide with a connected slab positioned on the dielectric layer 30. In contrast to the waveguide cores 12, 14, the waveguide cores 32, 34 are non-segmented and continuous.

In an embodiment, the waveguide cores 32, 34 may be composed of a material that has a refractive index that is less than the refractive index of the waveguide cores 12, 14. In an embodiment, the waveguide cores 32, 34 may be composed of a material that has a refractive index that is greater than the refractive index of the dielectric layer 30. In an embodiment, the waveguide cores 32, 34 may be composed of a material that has a refractive index in a range of about 1.8 to about 2.3. In an embodiment, the waveguide cores 32, 34 may be composed of silicon nitride. In an embodiment, the waveguide cores 32, 34 may be composed of polysilicon.

The waveguide core 32 includes a section 40 located directly over the input section 20 of waveguide core 12, a section 41 located directly over the routing section 21 of waveguide core 12, a section 42 located directly over the output section 22 of waveguide core 12, a section 43 located directly over the routing section 23 of waveguide core 12, and a section 44 located directly over the coupling section 16. The section 44 is connected to the section 40 by the section 41, and the section 44 is connected to the section 42 by the section 43. The section 40 of the waveguide core 32 may include a straight section that is terminated by a taper. The section 42 of the waveguide core 32 may also include a straight section that is terminated by a taper. The section 41 may include bends that displace the section 44 laterally relative to the section 40 and that are substantially equal in curvature to the bends of the routing section 21. The section 43 of the waveguide core 32 may include bends that displace the section 42 of the waveguide core 32 laterally relative to the section 44 and that are substantially equal in curvature to the bends of the routing section 23.

The waveguide core 34 includes a section 46 located directly over the input section 26 of waveguide core 14, a section 47 located directly over the routing section 27 of waveguide core 14, a section 48 located directly over the output section 28 of waveguide core 14, a section 49 located directly over the routing section 29 of waveguide core 14, and a section 50 located directly over the coupling section 16. The section 50 is connected to the section 46 by the section 47, and the section 50 is connected to the section 48 by the section 49. The section 46 of the waveguide core 34 may include a straight section that is terminated by a taper. The section 48 of the waveguide core 34 may include a straight section that is terminated by a taper. The section 47 may include bends that displace the section 50 laterally relative to the section 46 and that are substantially equal in curvature to the bends of the routing section 27. The section 49 of the waveguide core 34 may include bends that displace the section 48 of the waveguide core 34 laterally relative to the section 50 and that are substantially equal in curvature to the bends of the routing section 29.

The section 41 of the waveguide core 32 and the section 47 of the waveguide core 34 cooperate to reroute the respective physical paths of the waveguide cores 32, 34 such that the section 44 of the waveguide core 32 is positioned in close proximity to the section 50 of the waveguide core 34. The section 44 may have a sidewall 44a that is located adjacent to a sidewall 50a of the section 50 and the adjacent sidewalls 44a, 50a may be spaced by a spacing or distance, d. The section 46 of the waveguide core 32 may have a width, w1, and the section 50 of the waveguide core 34 may have a width, w2. The segments 24 of the coupling section 16 are each longer than a sum of the width, w1, the width, w2, and distance, d, between the section 46 of the waveguide core 32 and the section 50 of the waveguide core 34. The section 44 of the waveguide core 32 extends longitudinally over the coupling section 16 along a longitudinal axis 33, and the section 50 of the waveguide core 34 extends longitudinally over the coupling section 16 along a longitudinal axis 35. The segments 24 of the coupling section 16 are lengthwise oriented transverse to the longitudinal axes 33, 35 and are spaced along the longitudinal axes 33, 35.

The section 44 of the waveguide core 32 and the section 50 of the waveguide core 34 may have a width dimension in a range of three hundred (300) nanometers to two (2) microns, a thickness in a range of three hundred (300) nanometers to six hundred (600) nanometers, and a spacing, d, in a range of two hundred (200) nanometers to five hundred (500) nanometers. In an alternative embodiment, an additional pair of waveguide cores (not shown) constructed similar or identical to the waveguide cores 32, 34 may be disposed over the waveguide cores 32, 34.

Figure 5:
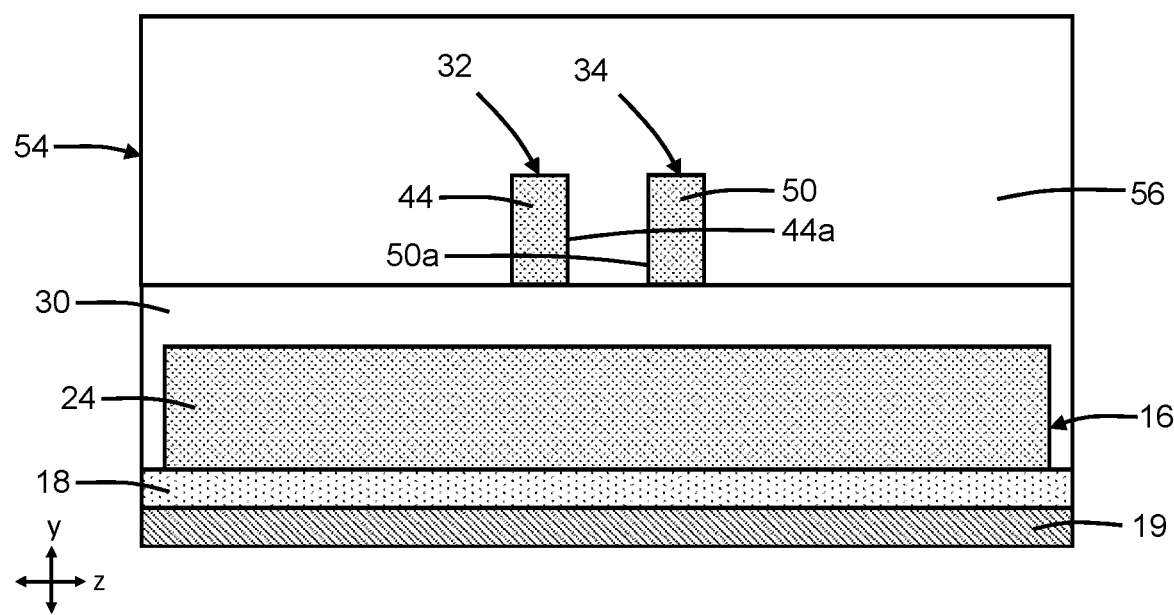
FIG. 5 is a cross-sectional of the structure at a fabrication stage subsequent to FIG. 4.

With reference to FIG. 5 in which like reference numerals refer to like features in FIG. 4 and at a subsequent fabrication stage, a back-end-of-line stack 54 is formed over the dielectric layer 36. The back-end-of-line stack 54 may include one or more interlayer dielectric layers 56 composed of one or more dielectric materials, such as a silicon dioxide, and metallization (e.g., contacts and wiring) composed of, for example, copper that is arranged in the one or more interlayer dielectric layers 56.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

Optical signals propagating as light with a mode component (e.g., the fundamental transverse electric (TE) mode) may be guided on the photonics chip by the waveguide core 12 to the structure 10. Optical signals propagating as light with a different mode component (e.g., the first-order transverse electric (TE) mode) may be guided on the photonics chip by the waveguide core 14 to the structure 10. In the coupling section 16, a portion of the light propagating in the waveguide core 12 is transferred to the waveguide core 14 and a portion of the light propagating in the waveguide core 14 is transferred to the waveguide core 12. In an embodiment, even (i.e., 50%-50%) splitting or approximately even splitting of the light may occur. Light of both mode components will exit the structure 10 through the output section 22 of the waveguide core 12 and also through the output section 28 of the waveguide core 14 to be further guided on the photonics chip to respective downstream destinations.

The structure 10 may provide a mechanism to couple light between the waveguides associated with the waveguide cores 12, 14. The light may be coupled with a desired coupling ratio, such as a 50%-50% coupling ratio that provides an even split of the light. The structure 10 may be less sensitive to fabrication variations in comparison with other types of optical couplers. The structure 10 may also provide a size reduction that increases the available layout area on the photonics chip for the placement of other components. The structure 10 has a wavelength insensitive (i.e., wavelength independent) construction compared with other types of optical couplers.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/− 10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical coupler, the structure comprising:
   a coupling section including a first plurality of segments arranged with a first pitch;
   a dielectric layer;
   a first waveguide core on the dielectric layer, the first waveguide core including a first section extending longitudinally over the first plurality of segments of the coupling section; and
   a second waveguide core on the dielectric layer, the second waveguide core including a first section extending longitudinally over the coupling section, the first section of the second waveguide core laterally spaced from the first section of the first waveguide core by a first distance,
   wherein the dielectric layer is positioned between the coupling section and the first waveguide core and between the coupling section and the second waveguide core.

2. The structure of claim 1 wherein the first waveguide core extends along a first longitudinal axis, the second waveguide core extends along a second longitudinal axis, and the first plurality of segments include a length in a direction that is transverse to the first longitudinal axis and the second longitudinal axis.

3. The structure of claim 2 wherein the first section of the first waveguide core has a first width, the first section of the second waveguide core has a second width, and the first plurality of segments are each longer than a sum of the first width, the second width, and the first distance.

4. The structure of claim 1 further comprising:
   a third waveguide core connected to the coupling section, the third waveguide core including a first section with a second plurality of segments spaced by a second pitch.

5. The structure of claim 4 wherein the second plurality of segments are arranged in a first plurality of bends, and the third waveguide core includes a second section coupled by the second plurality of segments with the coupling section.

6. The structure of claim 5 wherein the second plurality of segments decrease in length with increasing distance from the coupling section, and the second plurality of segments are rotationally oriented based on a curvature of the first plurality of bends.

7. The structure of claim 5 wherein the first waveguide core includes a second section positioned directly over the second plurality of segments, and the first section and the second section of the first waveguide core are non-segmented.

8. The structure of claim 7 wherein the second section of the first waveguide core includes a second plurality of bends positioned directly over the first plurality of bends of the third waveguide core.

9. The structure of claim 4 wherein the first waveguide core extends along a first longitudinal axis, the second waveguide core extends along a second longitudinal axis, the first plurality of segments include lengths that are transverse to the first longitudinal axis and the second longitudinal axis, and the first plurality of segments are longer than the second plurality of segments.

10. The structure of claim 4 further comprising:
    a fourth waveguide core connected to the coupling section, the fourth waveguide core including a first section with a third plurality of segments spaced by the second pitch.

11. The structure of claim 10 wherein the second plurality of segments are arranged in a first plurality of bends, the third waveguide core includes a second section coupled by the second plurality of segments with the coupling section, the third plurality of segments are arranged in a second plurality of bends, and the fourth waveguide core includes a fourth section coupled by the third plurality of segments with the coupling section.

12. The structure of claim 11 wherein the third plurality of segments decrease in length with increasing distance from the coupling section and are rotationally oriented based on a curvature of the first plurality of bends, and the third plurality of segments decrease in length with increasing distance from the coupling section and are rotationally oriented based on a curvature of the second plurality of bends.

13. The structure of claim 11 wherein the first waveguide core includes a second section positioned directly over the second plurality of segments, the second waveguide core includes a second section positioned directly over the third plurality of segments, and the first section and the second section of the first waveguide core and the first section and the second section of the second waveguide core are non-segmented.

14. The structure of claim 1 wherein the coupling section is comprised of a first material having a refractive index in a range of about 2.5 to about 5, and the first waveguide core and the second waveguide core are comprised of a second material having a refractive index in a range of about 1.8 to about 2.3.

15. The structure of claim 14 wherein the dielectric layer is comprised of a third material having a refractive index in a range of about 1 to about 1.6.

16. The structure of claim 15 wherein the first material is single-crystal silicon, the second material is silicon nitride, and the third material is silicon dioxide.

17. A method of forming a structure for an optical coupler, the method comprising:
   forming a coupling section including a first plurality of segments arranged with a pitch;
   forming a dielectric layer;
   forming a first waveguide core on the dielectric layer, wherein the first waveguide core includes a first section extending longitudinally over the first plurality of segments of the coupling section; and
   forming a second waveguide core on the dielectric layer, wherein the first waveguide core includes a first section extending longitudinally over the coupling section,
   wherein the second waveguide core is laterally spaced from the first waveguide core, and the dielectric layer is positioned between the coupling section and the first waveguide core and between the coupling section and the second waveguide core.

18. The method of claim 17, wherein the first waveguide core extends along a first longitudinal axis, the second waveguide core extends along a second longitudinal axis, and the first plurality of segments include lengths that are transverse to the first longitudinal axis and the second longitudinal axis.

19. The method of claim 17, wherein the coupling section is comprised of a first material having a refractive index in a range of about 2.5 to about 5, the first waveguide core and the second waveguide core are comprised of a second material having a refractive index in a range of about 1.8 to about 2.3, and the dielectric layer is comprised of a third material having a refractive index in a range of about 1 to about 1.6.

20. The method of claim 17 further comprising:
   forming a third waveguide core including a section connected to the coupling section; and
   forming a fourth waveguide core including a section connected to the coupling section,
   wherein the section of the third waveguide core includes a second plurality of segments arranged in a first plurality of bends, and the section of the third waveguide core includes a third plurality of segments arranged in a second plurality of bends.

* * * * *